US012445264B2

(12) United States Patent
Mohan et al.

(10) Patent No.: US 12,445,264 B2
(45) Date of Patent: Oct. 14, 2025

(54) SECURE COMMUNICATION AMONG KNOWN USERS

(71) Applicant: SN2N, LLC, Huntington, NY (US)

(72) Inventors: Steven D. Mohan, Colorado Springs, CO (US); Leonard J. Deroma, Huntington, NY (US); Giddon Ben-Dov, Stamford, CT (US)

(73) Assignee: SN2N, LLC, Huntington, NY (US)

( * ) Notice: Subject to any disclaimer, the term of this patent is extended or adjusted under 35 U.S.C. 154(b) by 88 days.

(21) Appl. No.: 18/019,520

(22) PCT Filed: Aug. 4, 2021

(86) PCT No.: PCT/US2021/044431
§ 371 (c)(1),
(2) Date: Feb. 3, 2023

(87) PCT Pub. No.: WO2022/039924
PCT Pub. Date: Feb. 24, 2022

(65) Prior Publication Data
US 2024/0275578 A1    Aug. 15, 2024

Related U.S. Application Data

(60) Provisional application No. 63/213,297, filed on Jun. 22, 2021, provisional application No. 63/067,837, filed on Aug. 19, 2020.

(51) Int. Cl.
*H04L 9/06* (2006.01)
*H04L 9/08* (2006.01)
*H04L 9/14* (2006.01)

(52) U.S. Cl.
CPC .......... *H04L 9/0618* (2013.01); *H04L 9/0869* (2013.01); *H04L 9/14* (2013.01)

(58) Field of Classification Search
CPC ....... H04L 9/0618; H04L 9/0869; H04L 9/14; H04L 9/083; H04L 9/0816;
(Continued)

(56) References Cited

U.S. PATENT DOCUMENTS

2002/0191793 A1   12/2002   Anand et al.
2003/0084292 A1    5/2003   Pierce et al.
(Continued)

FOREIGN PATENT DOCUMENTS

EP    3299988 A1    3/2018

OTHER PUBLICATIONS

The International Search Report and Written Opinion, mailed on Nov. 5, 2021, in the corresponding PCT Appl. No. PCT/US2021/044431.
(Continued)

*Primary Examiner* — Khoi V Le

(57) ABSTRACT

Systems and methods are disclosed for transmitting encrypted information that is computationally secure, wherein the probability is exceedingly low that such transmitted information may be deciphered is a reasonable time period or with typical computer processing power. The advantageous combination of (1) memory modules containing separate lists of cipher keys useable for creating secure encrypted communications between known and approved secure devices, and (2) a cipher key-selection and corresponding code generation techniques implemented, partially or wholly, in hardware advantageously makes for an extremely computationally secure systems and methods of communication that is relatively low-cost. Such combination facilitates implementation of cipher keys that are unpredictable or nearly unpredictable because even if a hacker somehow knows what cipher keys were used in prior communication sessions, such hacker could not predict what
(Continued)

cipher keys will be used in future communication sessions based on such known cipher keys.

21 Claims, 6 Drawing Sheets

(58) Field of Classification Search
CPC . H04L 63/0428; H04L 63/061; G06F 21/445; G06F 21/606; Y04S 40/20
See application file for complete search history.

(56) References Cited

U.S. PATENT DOCUMENTS

| | | |
|---|---|---|
| 2005/0228809 A1 | 10/2005 | Asano et al. |
| 2007/0242829 A1 | 10/2007 | Pedlow |
| 2008/0046714 A1 | 2/2008 | Suganthi et al. |
| 2008/0235511 A1 | 9/2008 | O'Brien et al. |
| 2020/0280584 A1* | 9/2020 | Zhao ...................... H04L 63/16 |
| 2022/0271930 A1* | 8/2022 | Takatsuka ................ H04L 9/50 |

OTHER PUBLICATIONS

Brenner et al. "Secret program execution in the cloud applying homomorphic encryption." 5th IEEE International Conference on Digital Ecosystems and Technologies (IEEE DEST 2011), IEEE, 2011. May 31, 2011, Retrieved on Oct. 4, 2021 from htttps://ieeexplore.ieee.org/abstract/document/5936608, entire document.

The extended European search report, mailed on Aug. 22, 2024, in the related European Appl. No. 21858805.1.

The Israel Office Action, mailed on Apr. 30, 2025, in the related Israel Appl. No. 300495.

* cited by examiner

Secure Communications Among Known Users

Figure 3

| | |
|---:|---|
| 1 | re randomizer 1 |
| 2 | re randomizer 2 |
| 3 | re randomizer 3 |
| . | . |
| . | . |
| . | . |
| n | re radomizer n |

Figure 4

Device #1

| | |
|---|---|
| Power On | Display Icons   Data Bus Encrypted |
| Initialization Mode | Biometric  MAC Addresses, Data Load → Initialization  OR  Data Load → Program<br>Loaded     Ciphers Loaded   Accepted      Complete           Failed     Terminated |
| Operational Mode | Send Handshake (Biometric Image,   Connection          Connection          Program<br>MAC Addresses, Communication → Enabled  OR  Terminated → Terminated<br>Cipher, Date/time stamp) |
| Connection Enabled | Send and Receive Encrypted Message |
| Connection Terminated | Send Break   OR   Communication<br>Signal            Carrier lost |

Device #2

| | |
|---|---|
| Communication Request | Power On   Display Icons   Data Bus Encrypted |
| Initialization Mode | Biometric  MAC Addresses, Data Load → Initialization  OR  Data Load → Program<br>Loaded     Ciphers Loaded   Accepted      Complete           Failed     Terminated |
| Operational Mode | Receive Then Send  Handshake         Connection         Connection         Program<br>(Biometric Image, MAC Addresses,  → Enabled  OR  Terminated → Terminated<br>Communication Cipher, Date/time stamp) |
| Connection Enabled | Receive and Send Encrypted Message |
| Connection Terminated | Send Break   OR   Communication<br>Signal            Carrier lost |

SECURE COMMUNICATION AMONG KNOWN USERS

CROSS-REFERENCE TO RELATED APPLICATIONS

This application is a National Stage Application of PCT/US2021/044431 filed Aug. 4, 2021, which claims priority from U.S. Provisional Application Nos. 63/213,297 filed on Jun. 22, 2021, and 63/067,837 filed on Aug. 19, 2020. The priorities of said PCT Patent Application and US Provisional Patent Applications are claimed. Each of the prior mentioned applications is hereby incorporated by reference herein in its entirety.

FIELD OF INVENTION

The present disclosure relates to systems and methods for secure communications among known users, and more specifically to secure encryption communication systems and methods.

All documents cited to or relied upon below are expressly incorporated herein by reference.

BACKGROUND

Cybersecurity has taken on many meanings in today's world. Everything from computer viruses to ransomware to data breaches and others present challenges to cybersecurity. Early computers connected to each other through cables and eventually through modems on copper telephone wires. In the current environment the move to the ubiquity of devices communicating wirelessly and then entering the "Internet" has transformed and continues to transform applications.

Whether for the thrill of the hack by a 16-year-old in his parent's basement to sophisticated international bad actors the concept of "hacking", surreptitiously invading a computer system where a person doesn't belong has increased tremendously. The cost of data breaches for example runs into the hundreds of millions of dollars every year with the theft of personal financial data from banks, brokerage firms, credit bureaus, insurance companies, retail merchants, medical organizations, etc. Additionally, risks to personal and national health have skyrocketed with the ability of hackers to invade implanted cardiac pacemakers or the power grid or autonomous driving vehicles. Virtually every industry, every military operation, every governmental agency, and every device becomes a potential entry point for a clever hacker with a computer or smart phone. Almost every day the news contains multiple stories of hacks, ransom, and data breaches. However, for certain public relations purposes, only a fraction of the stories is ever publicized with the majority resolved quietly. In any case it is costing money to consumers, the government, and private industry.

Some examples of security vulnerabilities include communications between two cell phones, microwave communication in the first responder system, autonomous driving vehicles, networked medical devices, battlefield communications between soldiers/headquarters/drones, power grids, a bank and its customers, a bank and correspondent banks, bond dealers and the Federal Reserve Bank, intra-corporate global price and marketing data, medical data, a lawyer and client, an investment banker and an acquirer of a public company, a lover and his mistress, and many others. One undesirable consequence of such vulnerabilities includes a risk of disclosure of data that has value for resale; others for example include situations that can be fatal such as a bad actor hacking into someone's pacemaker and holding them hostage, or making all self-driving cars run red lights at 60 mph.

For the last 35 years computer security has focused on software-only solutions. These solutions for example have included antivirus software, malware prevention, programmable firewalls, zero-day pattern detection, software encryption and substitution methodologies, among others. What is common among all of these, some of which are better than others, is that none of them work on a consistent, wide-application basis. Each one is targeted for specific circumstances, and even then, as can be seen from the news almost every day, they can be breached.

SUMMARY OF THE INVENTION

Systems and methods are disclosed for transmitting encrypted information that are computationally secure, wherein the probability is exceedingly low that such transmitted information may be deciphered in a reasonable time period or with typical computer processing power. These systems and methods advantageously rely on a combination of (1) memory modules containing separate lists of cipher keys useable for creating secure encrypted communications between known and approved secure devices, and (2) a cipher key-selection and corresponding code generation techniques implemented, partially or wholly, in hardware. Such combination facilitates selecting cipher keys for a respective communication session that are unpredictable or nearly unpredictable because even if a hacker somehow knows what cipher keys were used in prior communication sessions, such hacker could not predict what cipher keys will be used in current or future communication sessions based on such known cipher keys.

The systems and methods of these embodiments also advantageously do not require the intermittent software updates that are required by software-based encryption techniques to thwart the ever-growing abilities of hackers to hack into communications of software-based secure devices. A hacker would need to access and reverse engineer a secure device, and somehow determine which lists of cipher keys in the memory module are useable for secure communication with what specific other secure devices in order to hack the systems and methods of the embodiments described herein, as well as, for those embodiments implementing an encrypted data bus, the hacker would have to similarly determine the encryption methods and cipher keys used to for such data bus encryption. In order to thwart attempts if access and reverse engineering of these components of a secure device, additional components may be included with certain embodiments of the invention to prevent x-raying, micro-drilling, or any other mechanical or optical means with the intent of revealing the contents of such components.

In accordance with particular embodiments of the invention, a secure device for transmitting encrypted communications over a network comprises: a processor having an input for receiving a least one message to send to a first other secure device, the processor coupled to at least one data bus; a memory module communicatively coupled to the processor, and for storing at least one list of cipher keys for use with communication with the first receiver system, the first other secure device having a memory with a stored copy of the at least one list of cipher keys; cipher selection circuitry coupled to the processor, wherein the cipher selection circuitry is adapted to generate a selection code based on an algorithm indicative of a message encryption cipher key, a message decryption cipher key, a handshake message encryption cipher key, and a handshake message decryption cipher key, that are based on the at least one list of cipher keys, the corresponding cipher selection circuitry of the first other secure device being adapted to process the selection code to produce a copy of the message encryption cipher key, message decryption cipher key, handshake message encryption cipher key, and handshake message decryption cipher key, from the stored copy of the at least one list of cipher keys in the first other secure device memory; and a network interface communicatively coupled to said processor and adapted for transmitting and receiving digital information over a network to and from the first other secure device.

The processor is adapted to operate in an initialization phase by activating the cipher selection circuitry to produce the selection code, and to produce and transmit a handshake message via the network interface to the first receiver system, the handshake message comprising unencrypted network addresses of the secure device and the first other secure device, and the selection code; and to operate in a confirmation phase upon receiving a response handshake message transmitted by the first other secure device and to process first and second segments of the response handshake message with the handshake message encryption cipher key and the handshake message decryption cipher key, respectively, to obtain first and second data sequences and to compare the first data sequence to the message encryption cipher key, and to compare the second data sequence to the message decryption, to confirm that the first and second data sequences correspond to the respective message encryption and decryption cipher keys associated with the selection code, and upon confirming that the obtained first and second data sequences correspond to the respective message encryption and decryption cipher keys associated with the selection code, the processor is further adapted to operate in a transmission phase by encrypting at least one message received at its input based on the message encryption cipher key, and to transmit the resulting encrypted at least one message via the network interface to the first other secure device.

In accordance with particular method embodiments of the invention, a secure device contains a processor having an input for receiving a least one message to send to a first other secure device, the processor coupled to at least one data bus, a memory module for storing at least one list of cipher keys, a cipher selection circuitry for producing a selection code based on the at least one list of cipher keys, and a network interface adapted for transmitting and receiving digital information over a network to and from the first other secure device, and operates as follows. The processor activates the cipher selection circuitry to generate a selection code indicative of a message encryption cipher key, a message decryption cipher key, a handshake message encryption cipher key, and a handshake message decryption cipher key, based on the at least one list of cipher keys, wherein corresponding cipher selection circuitry in the first other secure device is adapted to process the selection code to produce a copy of the message encryption cipher key, message decryption cipher key, handshake message encryption cipher key, and handshake message decryption cipher key from the stored copy of the at least one list of cipher keys in the memory of the first other secure device. The processor then produces a handshake message comprising unencrypted network addresses of the secure device and first other secure device, and the selection code, and transmits the handshake message to the first other secure device.

Upon receiving from the first other secure device, a response handshake message, the processor processes first and second segments of the response handshake message with the handshake message encryption cipher key and the handshake message decryption cipher key, respectively, to obtain first and second data sequences, and compares the first data sequence to the message encryption cipher key, and the second data sequence to the message decryption, to confirm that the first and second data sequences correspond to the respective message encryption and decryption cipher keys associated with the selection code. Upon confirming that the obtained first and second data sequences correspond to the respective message encryption and decryption cipher keys associated with the selection code, the secure device operates in a transmission phase by encrypting at least one messages received at its input using the message encryption cipher key and transmitting the resulting encrypted at least one message via the network interface to the first other secure device.

Further embodiments of a secure device for transmitting encrypted communications over a network to a plurality of other secure devices includes a processor having an input for receiving a least one message to send to a first other secure device, the processor coupled to at least one data bus; a memory module communicatively coupled to the processor, and for storing at least one list of cipher keys for use with communication with the first other secure device, the first other secure device having a memory with a stored copy of the at least one list of cipher keys; cipher selection circuitry coupled to the processor, wherein the cipher selection circuitry is adapted to generate a least a selection code indicative of a message encryption cipher key, and a handshake message encryption cipher key, that are based on the at least one list of cipher keys, the corresponding cipher selection circuitry in each of the plurality of other secure devices being adapted to process the selection code to produce a copy of the message encryption cipher key and handshake message encryption cipher key, from the stored copy of the at least one list of cipher keys in each of the plurality of other secure devices; and a network interface communicatively coupled to said processor and adapted for transmitting and receiving digital information over a network to the plurality of other secure devices.

In such embodiment, the processor is adapted to operate in an initialization phase by activating the cipher selection circuitry to produce the selection code, and to produce and transmit a handshake message via the network interface to the plurality of other secure devices, the handshake message comprising an unencrypted group number associated with the plurality of other secure devices, and the selection code, and wherein the processor is further adapted to operate in a transmission phase by encrypting at least one message received at its input based on the message encryption cipher key, and to transmit the resulting encrypted at least one message via the network interface to the plurality of other secure devices.

In accordance with yet further method embodiments of the invention, a secure device contains a processor having an input for receiving a least one message to send to a plurality of other secure devices, the processor coupled to at least one data bus, a memory module for storing at least one list of cipher keys, a cipher selection circuitry for producing a selection code based on the at least one list of cipher keys, and a network interface adapted for transmitting to the plurality of other secure devices, and operates as follows.

The processor activates the cipher selection circuitry to generate a selection code indicative of a message encryption cipher key and a handshake message encryption cipher key, based on the at least one list of cipher keys, wherein corresponding cipher selection circuitry in each of the plurality of other secure devices is adapted to process the selection code to produce a copy of the message encryption cipher key and handshake message encryption cipher key from the stored copy of the at least one list of cipher keys in the memory of each of the plurality of other secure devices. The processor produces a handshake message comprising unencrypted group number associated with the plurality of other secure devices, and the selection code, and transmits the handshake message to the plurality of other secure devices. The processor then operates in a transmission phase by encrypting at least one messages received at its input using the message encryption cipher key and transmitting the resulting encrypted at least one message via the network interface to the plurality of other secure devices.

It would also be of benefit to have complete, secure, trusted communications between at least two nodes (devices) in a network. Those nodes might be a computer server to a cell phone, or an x-ray machine to the medical records area, or a drone to a soldier. This can best be done with combination of hardware and software that work together to prevent bad actors from ever getting into the system. Many malware and virus prevention techniques depend on the ability of the software to identify the threat or attack and attempt to neutralize it. As fast as such techniques develop, hackers find ways around them and produce new attack methods. The methodology disclosed herein and devices that implement it prevents any of those actions from ever happening. The elegance of device is not just the simplicity of the design at the high level, but also the complexity of how it is executed and executed correctly. The design can be implemented inexpensively, which contrasts with secure devices that provide trusted security characteristics but are orders of magnitude more expensive—such as those used by the intelligence agencies. The intelligence community depends on dedicated devices behind locked doors with armed guards and a custodian. Equipment and personnel costs are expensive, and there is no way mobility can occur thus precluding the use of those kinds of devices for things like cell phones, pacemakers, autonomous vehicles, the Internet of Things (IoT), etc.

Various embodiments of the teaching permit different but related techniques for the difference between mobile devices that need an orthogonal relationship with a specific authorized user, for example, and devices that are stationary and secured.

In one aspect of the present disclosure, securing communication between two devices could include mobile devices such as cell phones or first responder microwave communication devices and may involve one device as Device 1 (D1) having some biometric identification element that might include but not limited to an iris scan, facial recognition, fingerprint scan, hand geometry, finger geometry, vein recognition, voice authentication, or DNA identification, among others. This certifies that the person holding the device has the authorization to hold that device, i.e., that the person is a known, trusted user (KTU). This cannot be changed once initialized other than by a factory reset. The second device as Device 2 (D2) would have a biometric identification but not necessarily using the same technology.

D1 would initialize a conversation by powering on if it wasn't already on. A security icon and biometric icon would be displayed. The biometric for that device would be sensed or read, for example a fingerprint. As stated above, the biometric could be any element that identifies the KTU is in control of the D1. Once the biometric was sensed or read and authenticated the device would go into initialization mode. In one aspect, using a smart phone as an example, the screen of the smartphone would notify the user by displaying a message such as, "initialization phase." During this mode, three strong ciphers/keys (discussed below) are loaded into D1 registers from the D1 memory. If the ciphers are not correctly loaded, or the initialization fails for example for technical reasons, or doesn't occur after a request for initialization in a specified period of time (for example 15 seconds), then initialization fails, the device shuts down and would have to be reinitialized. Upon successful initialization, D1 then enters operational mode where a handshake message is encrypted by one of the ciphers and an attempt is made to connect to D2. Simultaneously D1 is encrypting the data bus with the first cipher in register 3. In one embodiment of the invention the cipher could be used to employ any one of a number of encryption techniques such as a transposition or substitution cipher, among others, or using some of the other recognized technique such as AES, RSA, triple DES, blowfish, among others. In another embodiment of the invention the cipher would encrypt the message by substituting a non-ASCII character set. One embodiment of the invention would encrypt (1) the handshake message that would also include at least another cipher of almost equivalent length, and an optional cipher renewal (CR), and (2) the encrypted image of the biometric used to validate the D1 authorized user. Additionally, the current timestamp, the sending media access control (MAC) address and the receiving MAC address are appended to the message in plaintext.

Upon receiving a request for connection, the D2 KTU needs to perform the same action on its side, i.e. performing biometric verification of the KTU. The same sequence of initialization phase and operational phase would be cycled through. Once D2 was operational then transmission of the encrypted handshake along with plaintext mac addresses and a timestamp is transmitted to D2. In one embodiment the D1 fingerprint is also transmitted. In one embodiment the encryption key to be used for the message body is also encrypted and made part of the message. In one embodiment the CR is encrypted and made part of the message. D2 reads the encrypted message, decrypts it using the same encryption key that D1 used to encrypt the message and if the handshake, sending mac address, receiving mac address and timestamp match then D2 performs a similar sequence acknowledging the D1 message by sending back its own handshake message and communication is permitted. If not then D2 assumes it may be under attack and shuts down any additional communication. In one embodiment the message is preserved for forensic purposes.

In one embodiment of the invention involving stationary devices such as computer servers D1 and D2 would be physically secured and guarded such as in a server farm. Since they are not assigned or allocated to humans there would be no biometric identification. However, the handshake sequence other than the transmission of D1 fingerprint would be the same. Like stationary devices that are locked are also other devices that are not locked but do not have a specified authorized user that could transmit a message. A device such as an IoT device, for example a "smart" home thermostat connected to a wireless network would establish the validation once but would always be connected wirelessly. In this way it could only communicate with the network and not with potential bad actors attempting to break into the network. If communication with the network is broken, then the device must reestablish the connection and the handshake sequence.

Each device would have a secure unit (SU) consisting of a central processing unit, a number of active registers, and storage. The central processing unit could be a specially designed computational device, a field programmable gate array (FPGA), an application specific integrated circuit (ASIC), or some other combination of elements that could produce an execution of a computer program. For ultimate security symmetric encryption is used which means that each side of the communication must use the same key. For the key to be effective it needs to be as long as is practical so that the less it needs to be repeated the less chance that it can be discovered. The more random the key the less likely it can be discovered by bad actors. A totally random key means that it is impossible to determine the next character knowing the existing character. No computer software can produce a completely random series of bits. There would be no conditional bits; each "1" or "0" would have equal probability of occurring. Even the best computer software can only generate pseudo random characters, which given enough computing power can be discovered. However, the techniques we teach here would minimize the possibility of key discovery such that even the use of a pseudo random number would maintain a high degree of security. Additionally, there are different levels of security needed—a video surveillance camera in the back yard may not be as much of a target as a bank server and therefore would find a number of different pseudo random ciphers available.

The key length can vary depending on use. For absolute security the key should be at least as long and preferably longer than the message it is encrypting to prevent repetition. For example, a lawyer transmitting a document may need a key of a million ASCII characters where a person communicating securely with their bank may only need a thousand ASCII characters. For true security the key would only be used once, and a new key would be furnished to both sides. That can be accomplished by having multiple keys installed in the device(s) from the beginning. In one embodiment each device would have n handshake ciphers and m message ciphers. However, it is possible to create a new random key from an existing random key. In a simple example assume the key is 100 characters (K) being used to encrypt a 40-character message (M). A random number of padding characters (P) is added by using the next several characters to determine the number of padding characters. The message length is now M+P<K. Since each character in K is completely random then it can be assumed that starting at any place in the key (K1 . . . K100) will also be random. A new key can be established for the next message by rotating the key either simply by starting the next message at character M+P+1 such that the next message length starting as noted exceeds K100 and begins again at K1 (M+P+1)mod(100). Alternatively, the key for each paired device can be altered randomly by using a starting cipher and a CR to rotating the key by taking a random N characters (as transmitted as the CR) after M+P+1 and applying any of a number of transformations to the existing key to generate a new random key. Given the fact that the key sequence is random then any rearrangement of the random key based on picking a part of the key which is also random should produce another random key.

In one embodiment each device can only communicate with one device. In another embodiment a device may communicate with a plurality of devices. Thus D1 would have unique cipher set for all other devices that it will communicate securely with (D2 . . . Dn.) Each pair of devices would have a unique cipher set for each other and thus would become a known pair (KP). Thus a personal use, non-military cell phone may only need secure communications with a half dozen other end points such as banks or brokerage firms. Computer servers may need to communicate securely with hundreds of thousands of other devices. A server as an example of D1 would store all unique random ciphers for each device with which it will have secure communications paired with MAC addresses and if necessary, an encrypted image of the biometric identification.

In one embodiment the SU is embedded in an FPGA, ASIC, or similar device. It is self-contained but has an interface to the operating system in the device (D1 or D2). The SU would be physically protected in two ways. First the SU would be covered with a substance capable of resisting x-ray or other type of electronic scans that attempt to see the integrated circuit gates, memory or register dump. In addition, the device is sealed and contains an inert gas such that if a microscopic hole were to be drilled into the chip or some other attempt was made to compromise the outer layer of the device the pressure would change by the release of the inert gas thus causing an embedded pressure sensor in the SU to trigger and thus causing the SU to self-destruct by creating a short circuit with enough power to destroy the key circuits. In another embodiment the SU is part of a larger set of components consisting of individual memories, cpus, and registers which may be etched onto silicon in the form of an FPGA, ASIC or similar design. In this embodiment the SU segregated portion of the components would be protected with the mechanisms described above.

BRIEF DESCRIPTION OF THE DRAWINGS

Some embodiments of the present invention are illustrated as an example and are not limited by the figures of the accompanying drawings, in which like references may indicate similar elements and in which:

FIG. 3 illustrates an example of a cipher key table useable by a secure unit for engaging in secure communication in accordance with various embodiments described herein.

FIG. 4 depicts a flow diagram of an exemplary method by secure units for engaging in secure communication in accordance with various embodiments described herein.

DETAILED DESCRIPTION

Figure 1:
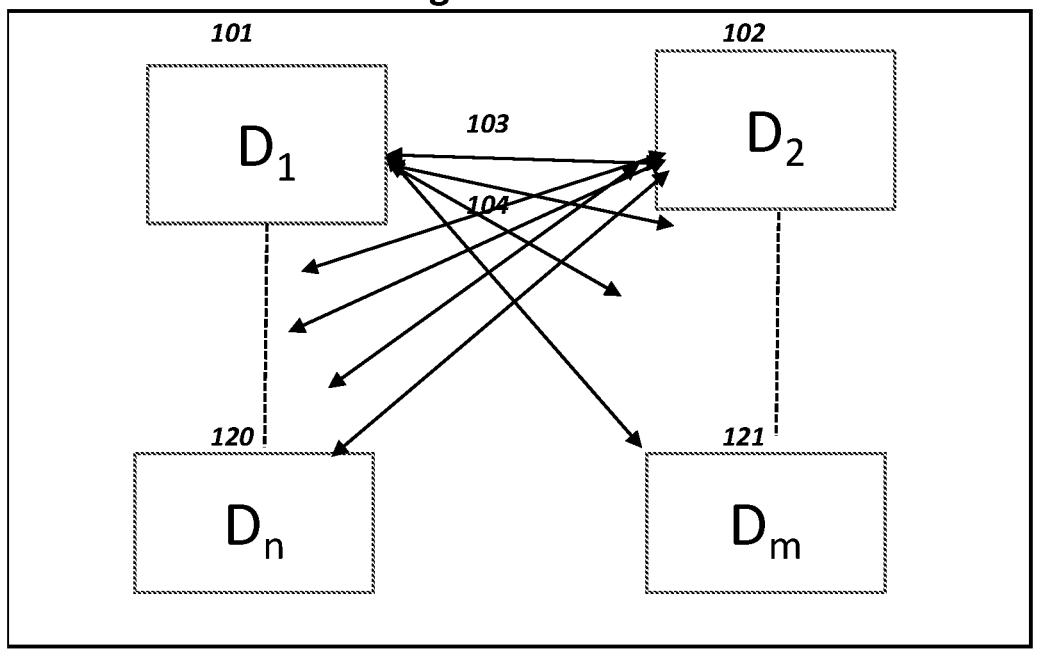
FIG. 1 depicts an illustrative example of a block diagram of user devices, i.e., secure units, for engaging in secure communication in accordance with various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. Moreover, a first element and second element may be implemented by a single element able to provide the necessary functionality of separate first and second elements.

As used herein the description, the term "and" is used in both the conjunctive and disjunctive sense and includes any and all combinations of one or more of the associated listed items. It will be further understood that the terms "comprises", "comprising," "includes," and "including", when used herein specify the presence of stated features, integers, steps, operations, elements, and/or components but do not preclude the addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending on the functionality/acts involved. Thus, while there are certain elements that must be done in sequence other elements may be done asynchronously.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Thus, the methods and systems of the present invention may be performed by a computer or computing device having a processor based on instructions from software or provided by computer applications.

The terms "secure device" and "secure unit" as used herein is a type of computing device generally capable of secure communication with other devices and computer servers, and in some instances in this disclosure such secure devices or secure units are referred to "transmitter systems" and/or "receiver systems." In some embodiments, a device is a smartphone or computer configured to receive and transmit data to a computer server or other device which may be operated locally or in the cloud. Non-limiting examples of devices include: computer servers, computers, personal computers (PCs), IoT devices portable communication devices, such as smartphones, laptops, tablet PCs, wearable devices, robots, consumer goods, industrial and manufacturing equipment, medical devices, e.g., pacemakers, insulin pumps, hearing aids, and communication systems installed in autonomous and non-autonomous vehicles, e.g., automobiles, trains, and airplanes, and other transport vehicles.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wi-Fi and cellular networks. For example, a network may include a local area network (LAN), a wide area network (WAN) (e.g., the Internet), a mobile relay network, an ad hoc network, a telephone network, a cellular network, or a voice-over-IP (VoIP) network.

The present disclosure is to be considered as an exemplification of the invention and is not intended to limit the invention to the specific embodiments illustrated by the figures or description below.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

FIG. 1 shows two secure devices 101 and 102 securely communicating with each other and other devices 120 and 121 in accordance with embodiments of the invention via communication channels 103 and 104. Suitable non-limiting communication channels for the communication channels 103 and 104 may include, for example, telephone lines, wireless communication, the Internet, wired communication, microwave transmission, shortwave radio, or other forms of electronic or optical communication. Both devices 101 and 102 are not orthogonal and therefore can communicate with multiple devices 120 and 121. 101 and 102, and can be stand-alone devices or parts of more complex devices such as a computer, cell phone, two-way radio. They may be stationary as in the case of a computer server, mobile as in the case of a cell phone, or a hybrid as in the case of an autonomous vehicle, or pacemaker, or an IoT device. Each of such devices 101 and 102 may operate as a transmitter system or a receiver system. The activation of devices 101 and 102 (and by extension 120 and 121) may be event driven in the sense that an authorized user can initiate secure communication, or they may be constantly connected as in the case of two computer servers in the same company. The communication between devices may be a hybrid of both event driven and constant as in the case of a computer server that is secure communication with another computer server but only occasionally with a cell phone.

Figure 2:
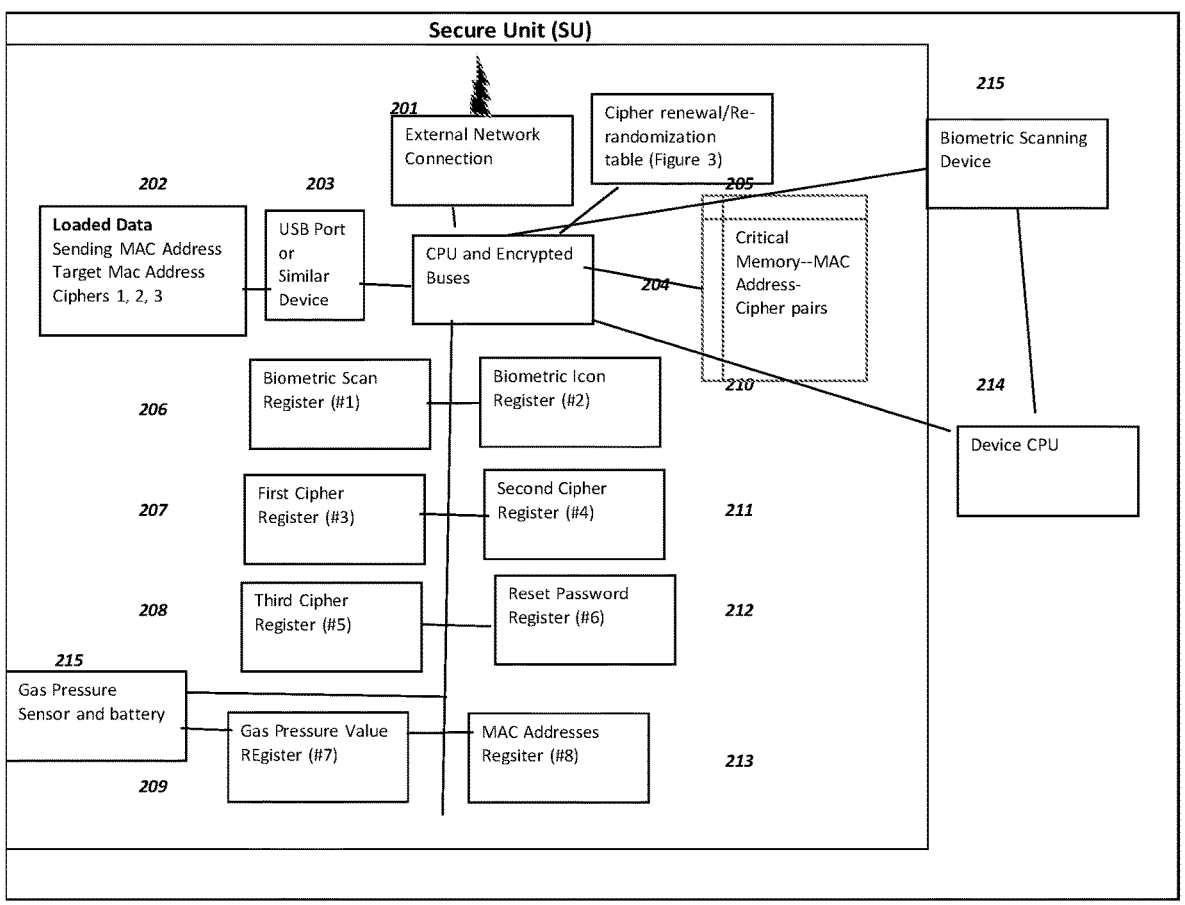
FIG. 2 illustrates a block diagram of an exemplary secure unit for secure communication in accordance with various embodiments described herein.

FIG. 2 shows more detail as to the establishment and methodology of communicating securely. In FIG. 2 in one embodiment the user engages the Secure Unit (SU) by pressing a "button" on a device for example a cell phone (101 or 102) in FIG. 1. A button may be a physical electric or electronic touch switch or it may be a pressure sensitive area of a touch screen. Another embodiment would always be on and would not have to be activated by a button. Once the device is powered on a security icon and biometric device are activated. If they are tapped simultaneously a specified number of times (for example, three) a message appears on the screen of the device indicating that the device is in the "initialization phase". During the initialization phase three strong ciphers are loaded into registers 3, 4, and 5 (207, 211 and 208). If the registers are not properly loaded the program terminates. The device senses or "reads" the biometric information of the authorized user using a biometric scanning device (215). If biometric identification of the authorized user, which is placed in Register 1 (206), agrees with the Biometric Icon identification in Register 2 (210) and the registers and program loads correctly then the device signals the display with "initialization complete" and then signals the display with "operational phase". If the values in 206 and 210 do not agree then the SU is shut down. In one embodiment the entire device (D1) may be shut down after receiving a non-agreement message from the SU. Physical reasons such as loss of signal, battery depletion or similar events will also cause the initialization phase to fail, and the program terminated. Depending on the application there may/will be a delay before another attempt can be made. In a battlefield situation it is possible that there will be no delay at a second attempt. In a civilian setting the delay may be as short at 15 seconds or as long as may be deemed to be required given the use. The delay time may be extended given the number of attempts and after a maximum number of failed attempts at identification verification the SU may shut down permanently or may need to be re-initialized by resetting passwords and/or identification. The process to reset passwords also depends on an encrypted message stored in Register 6 (212). Only an authorized administrator may change passwords or identification. This permits a device to be re-issued to another user or reset after failed attempts.

In the operational phase the SU encrypts the Data Bus 204 using the previously loaded randomly generated cipher in Register 3 (207). Each of the ciphers contained in the SU in FIG. 2 are symmetrical with respect to the second device. Therefore, the ciphers would have to be input in both devices. This can be done via an external device such as a memory card or USB device or using the Reset Password Cipher in Register 6 (212) by the administrator. Once the Data Bus is encrypted the sending SU, D1, will create a message (M1) including encrypting the Biometric Icon in register 2 (210), the handshake message itself, the encrypted second cipher (the message cipher) contained in register 4 (211) using the third cipher in register 5 (208) as the encrypting cipher, and optionally the CR, and appended as plaintext the sending MAC address, receiving MAC address, and the timestamp. M1 is then transmitted through the external network connection (201) to device D2. 201 may be a transmitter for phone, wireless network, wired network, microwave network, or other form of optical or electronic communication.

Upon receipt of the encrypted and plaintext handshake the second device, D2, would decrypt and validate the incoming encrypted message, ensure that it is associated with the sending MAC address, verify the timestamp. If D2 could not verify the incoming message, the SU of device D2 would immediately shut down and assume it is under attack. It could then save the message in isolated memory for forensic purposes and would shut down the SU of D2. In one embodiment the SU of D2 would transmit back to the SU of D1 the negative acknowledgement. In one embodiment if the SU of D2 does verify the message sent from D1 then D2 would perform the same process for identification verification that D1 performed, and if successful would then send an acknowledgement message back to D1 from a network connection/transmitter (201). When the handshake is complete a "communication enabled" message would appear on both devices.

Once the secure communication between D1 and D2 is established D1 would transmit a message (M2) which would be encrypted using the encryption key contained in register 5 (208). In one embodiment, M2 would embed a number of padded characters and a CR key. Two-way asynchronous communication can occur between the devices. It is important to understand that the message described in this invention can be any embodiment of data that can be represented digitally including but not limited to data, text, voice, sound, picture, video, or any combinations of data types.

FIG. 4 graphically displays the sequencing of the events.

It is important to understand that computer-generated keys are not random but are pseudo-random meaning that there exists a (small or very small) bias in the generation of characters. The smaller the bias the more difficult to reverse engineer the cipher. The only true random cipher would need to be generated externally. Reusing a cipher over a period of time can create an opportunity for a bad actor to eavesdrop and using various techniques reveal the cipher. In one embodiment of the invention the ciphers employed would all be sufficiently long enough to encode all messages. A limit on the size of the message can be set in such a way that it does not represent a real problem or inconvenience to users. The reason the message needs to be long enough is to prevent a repeat in the usage of the cipher by rolling to the beginning of the cipher if the message exceeded the cipher length. In one embodiment each device would have a series of ciphers similar to One Time Pads. Each cipher once used would be discarded. The capacity on the number of ciphers or characters within a cipher is dependent on the size of memory, the price of which continues to fall.

The use of the cipher could be in any one of a number of transformation or substitution techniques that demand the use of an encryption key. These techniques are public domain and any of which can be employed in this embodiment. Similarly, a new transformation or substitution technique can be employed at the desire of the user-pair provided that both are using the same technique. The use of a non-public transformation or substitution technique in no way changes the uniqueness of this invention.

In one embodiment the SU would take the message and using the appropriate cipher (the message cipher in register 4 (211) use any one of a number of encryption techniques to encrypt the message. In one embodiment the encrypted message sent could be in the form of non-ASCII characters.

As noted above, for true security the key would be random, would only be used once, and a new key would be furnished to both sides. However, it is possible to create a new completely random key from an existing random key. The classic definition of a random number is that the next character in a string cannot be determined or predicted in any way from the preceding character. In a simple example assume the key is 100 characters (K) being used to encrypt a 40-character message (CM). A random number of padding characters (P) is added by using the next several characters to determine the number of padding characters. Those padding characters are now also encrypted using the cipher. The message length is now CM+P<K. Since each character in K is random then it can be assumed that starting at any place in the key (K1 . . . K100) and wrapping around to the beginning will also be a random number. A new key (NK) can be established for the next message by rotating the key either simply by starting the next message at position CM+P+1 such that the next message length starting as noted exceeds K100 and begins again at K1 (M+P+1)mod(100). Alternatively, the key for each paired device can be altered by using a starting key or rotating the key by taking N characters after CM+P+1 and applying any of a number of transformations to the existing key to generate a new random key. Given the fact that the key sequence is random then any rearrangement of the random key based on picking part of the key which is also random produces another random key. What makes the encrypted message difficult to steal is that the cipher changes for each successive message so that it becomes impossible for a bad actor to employ the usual brute force or certain mathematical de-encryption techniques. This methodology depends on D1 and D2 remaining synchronized with each other relative to message lengths.

In one embodiment, such as for use of the device to transmit top secret drone video messages in real time the encryption cipher might not be changed until the end of the session, with a closing or session termination message containing the code to create a new key (NK) using the technique noted above.

In one embodiment the SU contains a lookup table (FIG. 3) of n re-randomizing cipher renewal keys, where n is sufficiently large. Embedded in a message M could be a plaintext or encrypted reference to the lookup table. The lookup table would use the index to the table provided and would then alter the cipher key based on the re-randomizer. At the end of each message or session depending on the use the SU would recreate a new random key providing one time use capability. Both the sending and receiving device would change the cipher key using the same re-randomizer. The process for re-randomization or cipher renewal could be any one of a number of standard substitution, nth elimination, or transposition techniques. The re-randomizing (cipher renewal) keys themselves are random or sufficiently random. Since the initial key is random, the CR keys are random, then any permutation based on a re-randomizing key will generate another random key.

Communication between D1 and D2 (101) and (102) terminate when either device issues a terminate or end of session message (MT). The message is sent plaintext along with the sending MAC address, the receiving MAC address, and the timestamp. The reason MT is sent plaintext is evident from the desire to not send encrypted what does not need to be encrypted in order to not expose the key any more than is necessary. Alternatively, the session would be terminated by any one of a number of abnormal ends (abends) such as signal loss, power loss, message quality erosion using standard established methods of measuring such actions. The quality of the signal is monitored by device outside the SU in the CPU of the device (214), which would communicate the situational abend to the SU CPU (204), which would then terminate the message.

In one embodiment the SU would be a component of devices D1 . . . DN that does not need biometric identification. It would be the case where a device does not come into contact with humans. It may be one device, D1, of communications or both sides, D1 and D2. An example of one side of communication would be a cell phone connecting to a server, say a person's bank account over the internet. The server would be known to be secure, being behind a locked door such as in a server farm. A second example might be a battlefield soldier in contact with a drone. The drone if in the air would not be in contact with humans, but the soldier would need to identify himself and validate using the process above. There are numerous examples of one or two-sided, non-human-contact that would not need biometric identification because secure trust has been previously established. All other protocols for the devices remain the same.

In one embodiment the SU could be protected from physical attack or compromise by having one or more of several methods of protection. To prevent someone from using an x-ray machine to "read" the microscopic circuit gates a thin layer of a metal substance that would attenuate the x-ray would be used to surround the integrated circuit. Similarly, the circuits and junctions would be dissipating heat. The heat pattern could be "read" by a bad actor. A thin layer of aluminum could absorb the heat making it impossible to read.

In order to prevent microscopic drilling and insertion of a microscopic camera to "read" the circuit, in one embodiment the SU could be impregnated with an inert gas and sealed to create a certain pressure inside the SU. Any microscopic drilling would release the gas. Inside the SU is a microscopic pressure sensor and battery (215) which would constantly transmit the pressure and compare it to the normal pressure level as stored in register #7 (209). If the pressure changed beyond the acceptable level the gas pressure sensor would trigger the battery to destroy key circuits in the SU.

Figure 5:
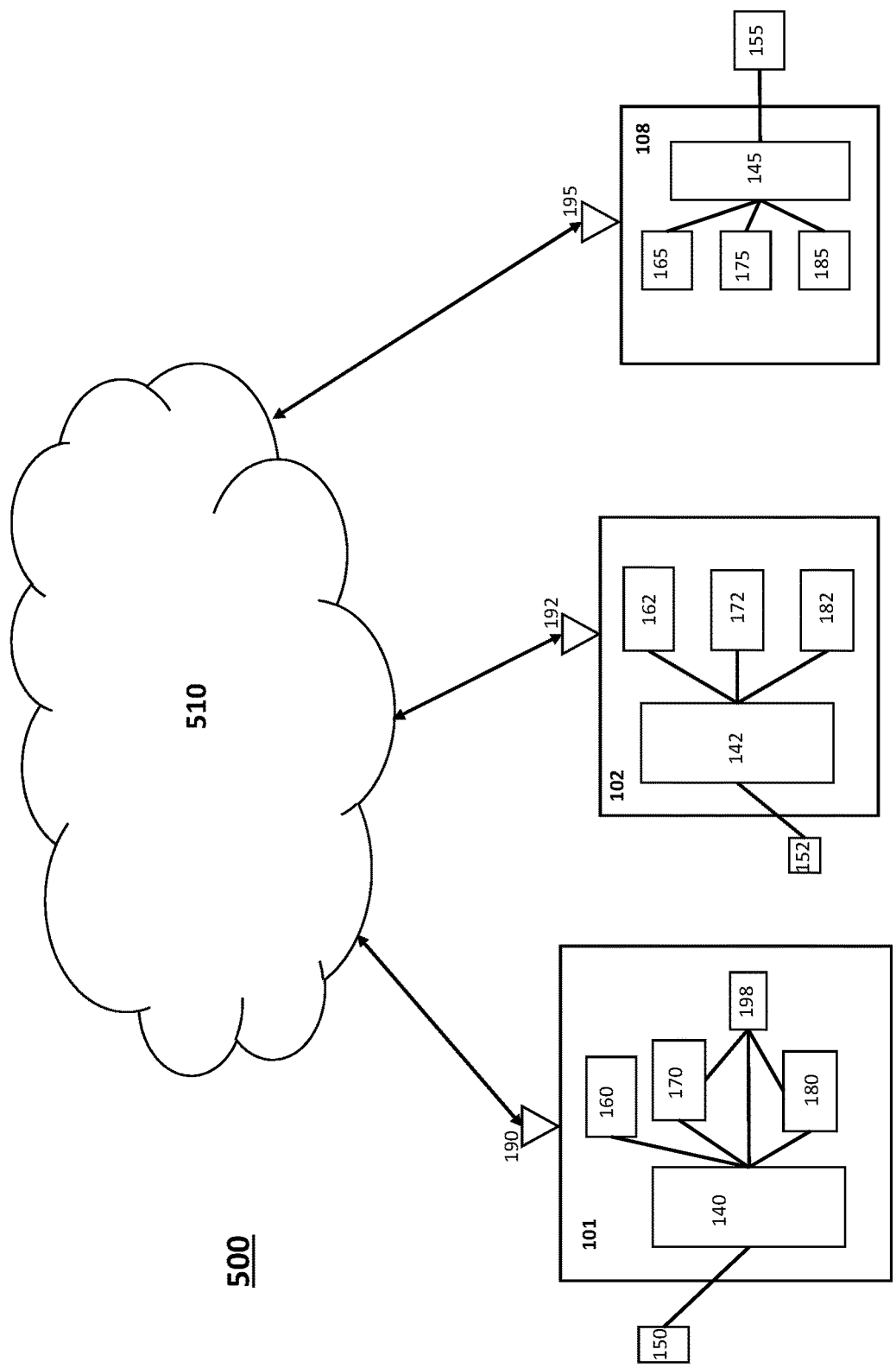
FIG. 5 depicts an illustrative example of a block diagram of components of the exemplary secure units of FIG. 1 for secure communication in accordance with other embodiments described herein.

FIG. 5 depicts a schematic block diagram 500 of an alternative embodiment of the secure devices 101 and 102 of FIG. 1, and a secure device 108 for engaging in secure communication over a network 510 in accordance with this disclosure. In FIG. 5, the secure device 101 includes processor 140 having an input communicatively coupled to a data source 150. The processor 140 is also communicatively coupled to an output a network interface 160, which in turn is connected to an antenna 190, such as for example, for use in a conventional 5G cellular network supporting IoT devices. The processor 140 is further connected to a cipher selection circuitry 170 and a memory module 180 containing a list of cipher keys, which may, for example, be included in the re-randomizing cipher key table depicted in FIG. 3. In addition, an optional tamper sensor 198 is depicted connected to the processor 140, cipher selection circuitry 170 and the memory module 180.

The secure devices 102 and 108 correspondingly comprise processors 142 and 145 having inputs communicatively coupled to data sources 152 and 155. The processors 142 and 145 are also communicatively coupled to network interfaces 162 and 165, which in turn is connected to antennas 192 and 195, respectively. The processors 142 and 145 are further connected to cipher selection circuitries 172 and 175, and memory modules 182 and 185 containing lists of cipher keys.

It should be readily understood that the type and nature of the data sources and network interfaces used for the data sources 150, 152 and 155, and network interfaces 160, 162 and 165, are not critical to practicing the described embodiments. Suitable data sources may include, for example, sources that provide digital information representing texts, symbols, images, audio and/or video or any combination thereof. Suitable network interfaces may include commercially available network interface adapters, and/or wireless network interface components depending on whether the secure devices are for operation with wired and/or wireless networks. Similarly, the type and nature of the processors employed for the processors 140, 142 and 145, are not critical to practicing the described embodiments, and commercially available microprocessors or processor systems, and/or custom application-specific integrated circuits or components are suitable for use with the described embodiments.

Because the disclosed embodiments implement an improved encryption communication method, the memory module of each secure device will contain at least one list of cipher keys that are identical to the corresponding at least one list of cipher keys in the memory module of a secure device with which it is permitted to engage in secure communications. For example, if secure device 101 is permitted to communicate with secure devices 102 and 108, but secure devices 102 and 108 are not permitted to communicate with each other, than the memory module 180 of secure device 101 would contain at least two lists of cipher keys with a first list useable for communication with secure device 102, which will contain a copy of that first list of cipher keys, and a second list of cipher keys useable for communication with secure device 108, which will contain a copy of the second list of cipher keys. However, the memory modules 182 and 185 of the secure devices 102 and 108 would each contain only a single list for communications with secure device 101, and no additional lists of cipher codes for communication with one another. Further, as described above, it is advantageous to employ random numbers or characters for the cipher keys in the lists of cipher keys, however, the use of pseudo-random numbers or sequences may still provide a relatively high degree of security, especially in view of the critical use of the cipher selection circuitries employed in the embodiments described herein.

In the present embodiment, the cipher selection circuitries of two secure devices permitted to communicate with one another will implement identical algorithms for generating and correspondingly reading a selection code indicative of a message encryption cipher key, a message decryption cipher key, a handshake message encryption cipher key, and a handshake message decryption cipher key, based on their identical list of cipher codes in their respective memory modules. A new selection code will be generated by an initiating secure device for each new communication session with another secure device. A communication session may, for example, encompass a single message, an exchange of predetermined number of messages, or an exchange of messages within a particular time period. A communication session may alternatively end after a predetermined period of time during which no further message exchange has occurred.

The particular selection code generation process employed by the selection circuitry of the initiating secure device in step 610 may be any predetermined process for generating a code that would be understood by the receiving device to identify the specific cipher keys to be used as the message encryption cipher key, message decryption cipher key, handshake message encryption cipher key, and handshake message decryption cipher key. Such selection code may, for example, be indicative of the cipher key locations in the list of ciphers in the memory modules, the starting bits of, and/or specific transformations to be performed on the cipher keys at the indicated locations. Such transformations may include those described above as well as reversing whole or portions of the cipher keys, constructing such cipher based on every other, or n-bits in the stored cipher key sequence, using selected sections of bits and characters of the cipher keys, combining different cipher keys, or the result of performing some mathematical operation on such cipher keys.

It is advantageous for such cipher selection circuitries 170, 172 and 175 as illustrated in FIG. 5 to implement identical algorithms using hardware. Suitable hardware for such purposes may include, for example, gate arrays, programmable gate arrays, application specific integrated components, and such hardware built into the respective processors. However, it is also advantageous to implement such cipher selection algorithms in hybrid hardware and software.

The cipher selection circuities 170, 172 and 175 may implement any number of different techniques and/or algorithms including allocating certain respective portions of the resulting selection code to the cipher key positions in the associated list of cipher keys for the receiving secure device, the starting numbers or bits within such cipher keys, and the transformation to be performed for producing the message encryption cipher key, message decryption cipher key, handshake message encryption cipher key, and handshake message decryption cipher key. The complexity of such techniques and algorithm may be based on the desired level of computational security required by the intended application of such secure communication between the devices. A representative simple circuitry would increment the cipher keys locations in the list and the starting numbers or bits at such cipher key locations with corresponding transformation of alternating forward or reverse bit sequences transformations for generating selection code sequences for communications sessions between such secure devices. Also, the cipher selection circuities may include hardware lookup tables for associating selection codes to corresponding cipher keys, start characters and transformations.

One of the myriads of techniques and algorithms performable by the cipher selection circuities 170, 172 and 175 includes an exemplary selection code of nine decimal numbers. Such nine-digit decimal number will be indicative of the message encryption cipher key, message decryption cipher key, handshake message encryption cipher key, and handshake message decryption cipher key, which would be transmitted in a handshake message with the address, such as for example, the 12-digit hexadecimal MAC address of the receiving secure device. For these cipher keys, the selection code will indicate four cipher key locations in the respective list of cipher keys in the memory modules of the initiating and receiving secure devices, the starting number locations within the keys at those locations, and the transformation performed comprising the steps between each number within the keys at those locations for forming number sequences, and whether the numbers sequences will be arranged in a forward or reverse sequence for producing the message encryption cipher key, message decryption cipher key, handshake message encryption cipher key, and handshake message decryption cipher key.

In accordance with such technique or algorithm, if the nine-digit decimal selection code as represented as a forward sequence $X=N_1$ to $N_9$ and reverse sequence $Y=N_9$ to $N_1$, then the location of the key locations in the memory modules may be expressed as follows:

Location $L_1 = [\text{ABS}(X - Y) * \text{SQRT}(X)/(X)]$ (for producing the message encryption cipher key);

Location $L_2 = [\text{ABS}(X - Y) * \text{SQRT}(Y)/(X)]$ (for producing the message decryption cipher key);

Location $L_3 = [\text{ABS}(X - Y) * \text{SQRT}(X)/(Y)]$ (for producing the handshake message encryption cipher key);

Location $L_4 = [\text{ABS}(X - Y) * \text{SQRT}(Y)/(Y)]$ (for producing the handshake message decryption cipher key).

Then, the first key number of the resulting cipher key may be taken from the location $[L_M+1]$, where M=1, 2, 3 or 4; and the steps between each cipher key digit at such location for forming the particular cipher key for use in communication would be, for example, the number value of digit $N_5$. Lastly, the step direction of forward or reverse would be based on selection code digit position $N_9$, wherein, for example, if $N_9$ is an odd number, then step direction is forward, and if $N_9$ is an even number, then step direction is reverse. It should be readily apparent that many other alternative techniques and algorithms may be use in generating and deciphering the selection code for initiating a message session.

In addition, the cipher selection circuitries 170, 172 and 175 may advantageously employ as part of their algorithms re-randomizers as, for example, employing the re-randomizer techniques described above with regard to FIG. 3, or other re-randomizer techniques. The use of re-randomizer techniques by the cipher selection circuitries 170, 172 and 175 may dramatically increase the number of random cipher keys that could be produced of the number of cipher keys that are contained in the list of cipher keys in any one of the memory modules 180, 182 and 185, useable between two secure devices.

In accordance with this embodiment and as described below with regard to FIG. 6, it is intended that the selection code received by a secure device that was transmitted by an initiating secure device be used as follows. Because the initiating and receiving secure devices were pre-approved for communicating with one another, i.e., as secure devices known to one another, they will contain corresponding selection circuitries and a common list of cipher keys in their memory modules. Upon receiving the selection code and an indicator of the identification and/or address of the initiating secure device in an initiating handshake message from the initiating secure device, the receiving secure device will be able use such selection code and an indicator for the selection circuitry and its memory module based on the identification and/or address of the initiating secure device to produce the message encryption cipher key, message decryption cipher key, handshake message encryption cipher key, and handshake message decryption cipher key as in the initiating secure device. Once the receiving secure device produces such identical set of cipher keys, it creates and sends to the initiating secure device a response handshake message containing, inter alia, at least two data sequence segments. The first of such segments being a data sequence corresponding to the message encryption cipher key encrypted by the handshake message encryption cipher key, and the second segment being a data sequence corresponding to the message decryption cipher key encrypted by the handshake message decryption cipher key.

Figure 6:
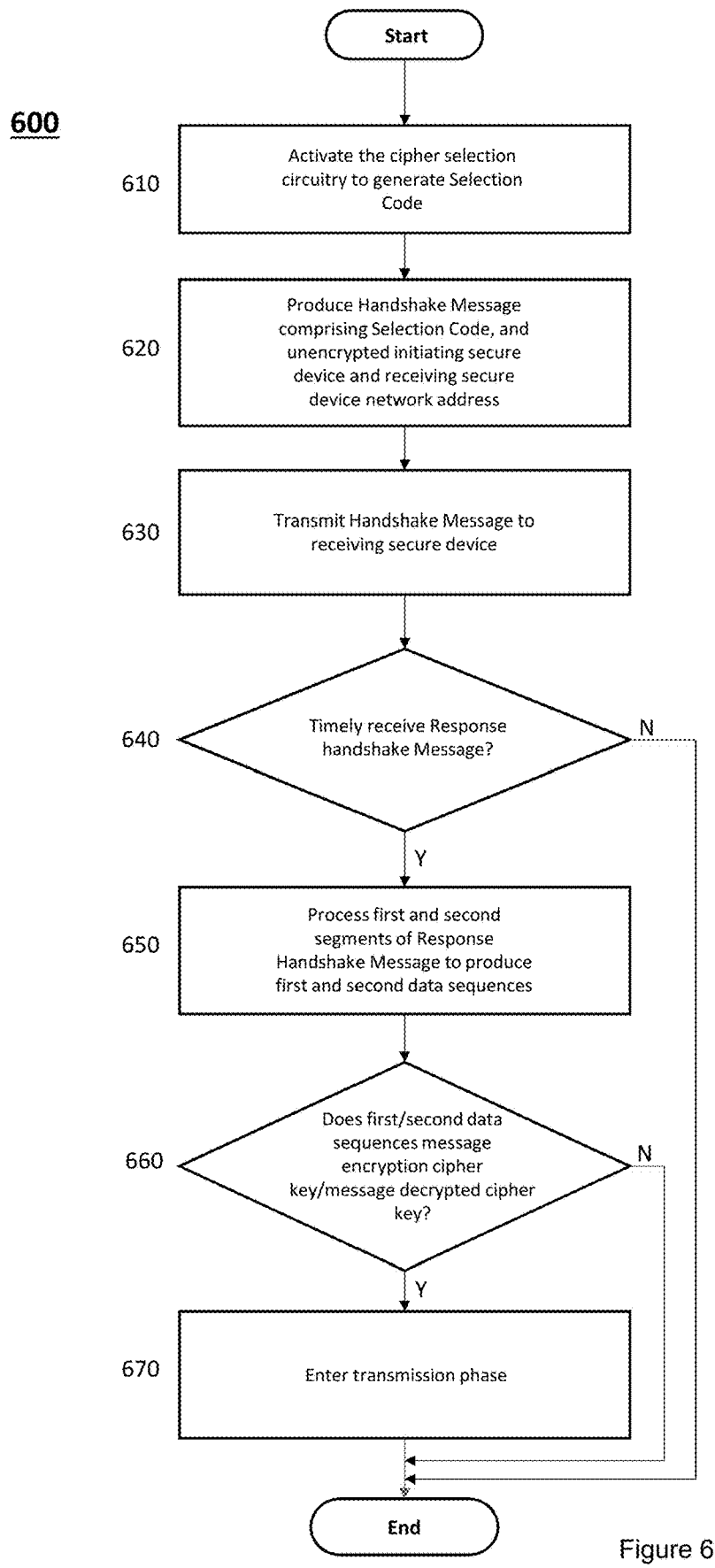
FIG. 6 depicts a flow diagram of an exemplary method by the secure units of FIG. 5 for engaging in secure communication in accordance with other embodiments described herein.

FIG. 6 is an exemplary flow diagram of the method 600 of the operation of the secure devices 101, 102 and 108, for establishing secure communications for a communication session. The following description of FIG. 6 is made with reference to the devices and components depicted in FIG. 5. When the secure user device 101 wishes to initiate a communication session with, for example, secure device 102, the processor 140 initiates the method 600 by performing step 610 by activating the cipher selection circuitry 170 and providing such circuitry at least an identifier indicative of the secure device 102 for the generation of the selection code.

In step 620, the processor 140 produces a handshake message comprising the produced selection code, and unencrypted network addresses of the secure device 101 and the other secure device, i.e., the secure device 102. The produced handshake message may optionally contain a timestamp indicative of the time that the handshake message will be transmitted. Then, in step 630, the processor 140 transmits the produced handshake message, via the network interface 160 and network 510 to the secure device 102.

Then, in step 640, the processor 140 determines whether the secure device 101 received a response handshake message transmitted over the network 510 by the secure device 102. If such message is not received within a particular time interval after it transmitted its initiating handshake message, the method 600 ends and no secure communication will be initiated. In such instance, the processor 140 may preferably wait for some period of time before performing the method 600 again in an attempt to establish secure communications with the secure device 102. It is suitable to include a timestamp in the handshake message to enable the receiving secure device 102 to determine if a security threat exists by evaluating the time that has passed between the time indicated in the time stamp, and time of receipt of the handshake message. If a determination is made that too much time has passed, then the secure device 102 will not transmit a response handshake message back to the secure device 101.

If in step 640, the response handshake message is timely received by the secure device 101, the processor 140 initiates processing of the response handshake message in step 650. If the response handshake message is legitimate from the secure device 102 that properly interpreted the received selection code, the response handshake message should comprise at least two segments as described above with regard to FIG. 5. The first segment would be a data sequence corresponding to the message encryption cipher key encrypted by the handshake message encryption cipher key, and the second segment would be a data sequence corresponding to the message decryption cipher key encrypted by the handshake message decryption cipher key. The processing performed by the processor 140 in step 650 would be to decrypt the first and second segments using the handshake message encryption cipher key and handshake message decryption cipher key, respectively, to produce the first and second data sequences that should be the message encryption cipher key and the message decryption cipher key, respectively.

In step 660, the processor 140 compares the first and second data sequences to the anticipated message encryption cipher key and the message decryption cipher key, and if there is not a match, the method 600 ends as does not permit the secure device to enter a message transmission phase, as a potential cyber threat may exist. However, if in step 660, the processor 140 confirms that a match with the message encryption cipher key and the message decryption cipher key occurs, the method 600 proceeds to step 670.

In step 670, the secure device 101 operates in a transmission phase for a communication session by encrypting messages received from the data source 150 with the message encryption cipher key to produce encrypted messages that are transmitted via the network interface 160 and network 510 to the secure dive 102. Optionally, the secure device 101 may begin by sending a verification or confirmation message to the secure device 102 indicating that the response handshake exchange contained the expected information, and that secure communication between the devices can occur for the initiated communication session.

Conversely, during the transmission phase, the secure device 102 could perform like operations to decrypt received encrypted messages using the message encryption cipher key, and to encrypt messages using the message decryption cipher key prior to transmitting such resulting encrypted messages to the secure device 101.

A person of ordinary skill in the art should understand that the particular encryption methods using the respective cipher keys is not critical to implementing the embodiments described herein. Suitable encryption techniques include, for example, existing encryption techniques of transposition or substitution cipher, Advanced Encryption Standard ("AES") techniques, Rivest-Shamir-Adleman ("RSA") encryption, triple Data Encryption Standard ("Triple DES"), Blowfish, and other known and non-standard encryption techniques. In another embodiment of the invention the cipher would encrypt the message by substitution using a non-ASCII character set.

The present invention provides systems and methods for transmitting encrypted information that is computationally secure, wherein the probability is exceedingly low that such transmitted information may be deciphered is a reasonable time period or with typical computer processing power. Such systems and methods advantageously employ a combination of (1) the memory modules containing separate, but shared, lists of cipher keys useable for creating secure encrypted communications between approved, i.e., known, secure devices, and (2) the cipher key-selection and corresponding code generation technique implemented, partially or wholly, in hardware advantageously. Such combination facilitates implementation of cipher keys that are unpredictable or nearly unpredictable because even if a hacker somehow knows what cipher keys were used in prior communication sessions, such hacker could not predict what cipher keys will be used in future communication sessions based on such known cipher keys.

The systems and methods of these embodiments also advantageously do not require the intermittent software updates that are required by software-based encryption techniques to thwart the ever-growing abilities of hackers to hack into communications of software-based secure devices. A hacker would need to access and reverse engineer a secure device, and somehow determine which lists of cipher keys in the memory module are useable for secure communication with what specific other secure devices in order to hack the systems and methods of the embodiments described herein, as well as, for embodiments that make use of encrypted data buses, determine the encryption methods and cipher keys used to encrypt such data buses.

In order to thwart attempts if access and reverse engineering of these components of a secure device, additional components may be included with the embodiments of the invention to prevent x-raying, micro-drilling, or any other mechanical or optical means with the intent of revealing the contents of such components including, for example, the cipher selection circuitries 170, 172, and 175, memory modules 180, 182 and 185, and/or processors 140, 142 and 145, depicted in the embodiment of FIG. 5.

To this end, it is advantageous to employ mechanisms with such components to detect and/or otherwise thwart reverse engineering efforts to render the circuitry and memory contents unreadable and/or undiscernible. For example, metal shielding of these components could be employed to obstruct the taking of x-ray images. In addition, the components may reside in an enclosure containing pressurized inert gas and include a tamper sensor, such as tamper sensor 190 depicted in the secure device 101 of FIG. 5, and associated battery or power source, such if the tamper sensor 198, e.g., a pressure sensor, detects a mechanical attempt at accessing the components, such as by micro-drilling, which would cause a release of such gas, and based on the corresponding detected reduction in pressure by the tamper sensor 198, the battery would be connected to the components in such way as to destroy them to an extent that they are unreadable and/or undiscernible. The pressure sensor and battery 215 described above with respect to FIG. 2 is suitable for use as the tamper sensor 198 and associated battery (not shown) in FIG. 5.

To further increase the level of security of such system, it would be advantageous for the cipher keys in the list of cipher keys to have a bit length and/or character length at least as long as the largest (or typical) message to be transmitted by a secure device during a communication session, and preferably more than five times as long as the largest (or typical) message, or most preferably at least 10,000 characters in length. It is possible to employ cipher keys of shorter bit lengths using conventional techniques, such as padding or wrapping of the cipher to expand to at least the length of the message to be transmitted, albeit with a reduction in security.

In order to provide further additionally increased security using the secure communication systems and methods described herein, it would be advantageous to never reuse cipher keys, especially random cipher keys, once they have been used in a secure communication session between secure devices, as it would make employing of any statistical analysis or pattern matching by a hacker or cryptanalysts impossible, or exceedingly difficult. If less security is acceptable for communication between secure devices, it could be acceptable to reuse such cipher keys for communication between devices only after a large interval of time has passed, for example, on the order of months or years, and/or only after a sufficiently large number of communications sessions have occurred, which for example, may be on the order of millions, depending on the acceptable level of security for the application.

Further, it is advisable that at list of at least one million, and preferably greater than 100,000,000, and most preferably greater than 250,000,000, different cipher keys be provided a list of cipher keys in a memory module for communication with a specific other device. A skilled artisan would realize that there are a significant number of ways for a secure device to track the use of cipher keys including, for example, including a maintaining a list, or some other indicator(s), of used cipher keys in a non-volatile memory in the secure device.

Depending on the level of security required, it may be suitable to use a single handshake cipher key for initiating communications between secure devices in a communications session, wherein the handshake message cipher key and the handshake message decryption cipher key are the same key. Similarly, if a lower level of security is acceptable, it may be suitable to use a single encryption cipher key for exchanged message between two secure devices, wherein such single encryption cipher key may symmetrically be used for the message encryption cipher key and the message decryption cipher key. Further, for significantly increased security, the produced selection code by the initiating secure device may indicate to the other secure device to employ different message ciphers for encrypting individual messages transmitted during the transmission phase of a single communication session, in a cipher key-hopping like manner, wherein the selection circuitry will establish the sequence of the encryption cipher keys to be employed during such communication session.

Random cipher keys such as are included in the lists provided in the memory modules may be generated using techniques, including well-known techniques, based on monitoring at least one random property of a counting of an element of a physical property over time as described in, for example, Roger R. Dube, *"Hardware Key Generation"*. *Hardware-based Computer Security Techniques to Defeat Hackers: From Biometrics to Quantum Cryptography*. John Wiley & Sons. pp. 47-50 (2008). ISBN 978-0-470-42547-3. In one embodiment, random data useable for the cipher keys may be derived by hardware accessing data produced by processes of a truly non-deterministic nature, e.g., data representing radioactive decay and electron tunneling in electronic components which are both non-deterministic phenomena produced by events occurring at the quantum subatomic level. Such random data useable for the cipher keys may additionally or alternatively be obtained by gathering and processing the output from Geiger counters or Zener diodes. Further, although it is desirable for the highest levels of security that the memory module include lists of random cipher keys, it may be possible to use pseudo-random cipher keys or a combination of random and pseudo random ciphers in the memory modules for many applications.

In order to further increase security of a secure device, it would be advantageous for the signals transmitted over the data bus or data buses be likewise encrypted to thwart any reverse engineering effort of probing signals to gain an understanding and predictability of the encryption/decryption cipher keys for any given communication session.

Also, in order to increase security further, the response handshake message transmitted by the receiving secure device may include a third data sequence segment containing an encrypted predetermined identifier that is indicative of a property of the receiving secure device and/or its associated user or operator that would be anticipated by the initiating secure device. Such identifier of a secure device and/or user that may be any code, number or data sequence, or be generated by execution of an algorithm that is known by the receiving and initiating secure devices. Such referenced algorithm may be, for example, a mathematical formula implemented in hardware or a combination of hardware and software, to generate an identifier that would be unique to the receiving secure device. In the alternative, such unique identifier may be a preselected cipher key sequence at a preselected location in the list of cipher keys for the receiving secure device, such as for example, the last cipher key in such list of cipher keys, either alone or transformed in a predetermined manner. Then, in the perform of the method 600, the steps 640 through 660 would further include the steps of (a) decrypting a third segment of the response handshake message to obtain a third data sequence, (b) comparing such third data sequence to the predetermined identifier, and (c) permit entry into the transmission phase if the data sequence corresponds to the predetermined identifier.

In another embodiment, upon confirming by the initiating secure device that the response handshake message contains the expected information, two communicating secure devices may use multiple message encryption and decryption ciphers keys, wherein by executing symmetric selection algorithms, which may be implemented in the selection circuitry, for selecting different message cipher keys for encrypting different messages during the transmission phase of a communication session.

Although many of the embodiments described herein are directed to secure communications between an initiating secure device and an individual or single receiving devices, the systems and methods may also be adapted for use in a broadcast mode wherein an initiating secure device would send secure messages in a secure message session to a group, i.e., plurality, of receiving secure devices. In accordance with such an embodiment, an initiating device would send a handshake message that is an initial broadcast alert message with no anticipated response message from the intended recipient secure devices. Such handshake message or initial broadcast alert message may comprise, for example, a broadcast group number GN (instead of a single receiving secure device address) and a selection code based on a message encryption cipher key encrypted by a handshake message encryption cipher key. As intimated above, such initial broadcast alert message need not include the decryption message encryption cipher key encrypted by a handshake message decryption cipher key.

In such embodiment, the group number may be associated with a specific plurality of secure receiving devices by a service provider. For example, an automotive manufacturer may assign secure devices in vehicles it manufactured for sale in a given country region to a particular group number for over-the-air software updates and the like. Such group number may, for example, comprise six numbers with six padded zeros to be used as a substitute to a 12 digit MAC address for the initial broadcast alert message. Also for use in such initial broadcast alert message, the selection code may be generated by the cipher selection circuitry in a similar manner as that for the embodiments described above with regard to the initiating secure device and single receiving device communication. As above, the cipher selection circuities may include hardware lookup tables for associating selection codes to corresponding cipher keys, start characters and transformations. In accordance with another representative example technique or algorithm, a nine-digit decimal selection code may be represented as a forward sequence $X=N_1$ to $N_9$ and reverse sequence $Y=N_9$ to $N_1$, then the location of the locations of the memory modules may be expressed as follows:

Location $L_1 = [\text{ABS}(X - Y) * \text{SQRT}(X)/(X)]$ (for the producing the message encryption cipher key);

Location $L_2 = [\text{ABS}(X - Y) * \text{SQRT}(X)/(Y)]$ (for the producing the handshake message encryption cipher key);

Then, the first key number or character of the key may be taken from the location [$L_M$+(GN*2,999)], where M=1 or 2; and the steps between each digit in the key would be S=$N_5$. Lastly, the step direction of forward or reverse would be based on selection code digit position $N_9$, wherein, for example, if $N_9$ is an odd number, then step direction is forward, and if $N_9$ is an even number, then step direction is reverse. It should be readily apparent that many other alternative techniques and algorithms may be use in generating and deciphering the selection for initiating a broadcast message session.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims. In particular, although the invention was described herein as comprising separate and distinct components within a secure device, namely, processors, cipher selection circuitries and memory modules as separate components, it is possible to combine such components and/or their functionality into a smaller number of components or a single security component.

The invention is further described by the following numbered paragraphs:

1. A secure device for transmitting encrypted communications over a network comprising:
   a. a processor having an input for receiving a least one message to send to a first other secure device, the processor coupled to at least one data bus;
   b. a memory module communicatively coupled to the processor, and for storing at least one list of cipher keys for use with communication with the first other secure device, the first other secure device having a memory with a stored copy of the at least one list of cipher keys;
   c. cipher selection circuitry coupled to the processor, wherein the cipher selection circuitry is adapted to generate a selection code indicative of a message encryption cipher key, a message decryption cipher key, a handshake message encryption cipher key, and a handshake message decryption cipher key, that are based on the at least one list of cipher keys, the corresponding cipher selection circuitry of the first other secure device being adapted to process the selection code to produce a copy of the message encryption cipher key, message decryption cipher key, handshake message encryption cipher key, and handshake message decryption cipher key, from the stored copy of the at least one list of cipher keys in the first other secure device memory; and
   d. a network interface communicatively coupled to said processor and adapted for transmitting and receiving digital information over a network to and from the first other secure device,
   wherein the processor is adapted to operate in an initialization phase by activating the cipher selection circuitry to produce the selection code, and to produce and transmit a handshake message via the network interface to the first other secure device, the handshake message comprising unencrypted network addresses of the secure device and the first other secure device, and the selection code, and
   wherein the processor is further adapted to operate in a confirmation phase upon receiving a response handshake message transmitted by the first other secure device and to process first and second segments of the response handshake message with the handshake message encryption cipher key and the handshake message decryption cipher key, respectively, to obtain first and second data sequences and to compare the first data sequence to the message encryption cipher key, and to compare the second data sequence to the message decryption, to confirm that the first and second data sequences correspond to the respective message encryption and decryption cipher keys associated with the selection code, and
   wherein, upon confirming that the obtained first and second data sequences correspond to the respective message encryption and decryption cipher keys associated with the selection code, the processor is further adapted to operate in a transmission phase by encrypting at least one message received at its input based on the message encryption cipher key, and to transmit the resulting encrypted at least one message via the network interface to the first other secure device.

2. The system of paragraph 1 wherein the processor is further adapted to operate in a reception phase by decrypting at least one message received from the first other secure device based on the message decryption cipher key.

3. The system of paragraph 1 wherein the message encryption cipher key is at least as long as a predetermined length of the message to be encrypted.

4. The system of paragraph 1 wherein the cipher selection circuitry is adapted to produce the selection code based on cipher key locations of the four cipher keys within the at least one list of cipher keys.

5. The system of paragraph 1 wherein the cipher selection circuitry is further adapted to produce the selection code corresponding to at least one of the four cipher keys being a transformation of at least one cipher key at a cipher key location with the at least one list of cipher keys.

6. The method of paragraph 5 wherein such transformation of at least one cipher key is a re-randomization of such at least one cipher key.

7. The system of paragraph 1 wherein the processor is adapted to retrieve from said memory module a data bus cipher code for at least one of encrypting or decrypting signals received and transmitted over the at least one data bus.

8. The system of paragraph 1 wherein the system is adapted to transmit encrypted messages to at least a second other secure device, and wherein the stored at least one list of cipher keys in the memory module includes a list of cipher keys useable for encrypting the messages to the second other secure device.

9. The system of paragraph 8 wherein the stored at least one list of cipher keys in the memory module include respective lists of cipher keys useable with respect to the first and at least the second other secure device.

10. The system of paragraph 9 wherein the indicators of the first and at least the second other secure devices are stored in the memory module and associated with the respective lists of cipher keys useable with respective first and at least the second other secure devices.

11. The system of paragraph 1 wherein the at least one list of cipher keys includes at least 1,000,000 cipher keys.

12. The system of paragraph 1 wherein the at least one list of cipher keys includes a number of cipher keys corresponding to at least a number of bits in at least one of the messages for transmission to the second other secure device.

13. The system of paragraph 11 wherein the at least one list of cipher keys includes a number of cipher keys so that such system would not repeat the use of any cipher key over a sufficiently long period of time.

14. The system of paragraph 1 wherein the processor is adapted to not enter the transmission phase if during the confirmation phase the processor is unable to confirm that the obtained first and second data sequence corresponds to the respective message encryption and decryption cipher keys associated with the selection code.

15. The system of paragraph 1 wherein the processor is adapted to produce the handshake message further comprising an unencrypted time stamp indicative a time of transmission of the unencrypted handshake message.

16. The system of paragraph 1 wherein the processor is further adapted to produce the handshake message comprising an encrypted predetermined identifier indicative of a property of least the first other secure device or a user of the first other secure device.

17. The system of paragraph 16 wherein the processor is further adapted to (a) decrypt a third segment of the response handshake message to obtain a third data sequence, (b) compare such third data sequence to a predetermined identifier, and (c) enter the transmission phase if the data sequence corresponds to the predetermined identifier.

18. The system of paragraph 1 wherein the stored at least one list of cipher keys for use with communication includes at least one randomly-generated key.

19. The system of paragraph 18 wherein the stored at least one randomly-generated key was generated based on monitoring at least one random property of a counting of an element of a physical property over time.

20. The system of paragraph 19 wherein the stored at least one randomly-generated key was generated based on monitoring at least one random property of a counting of the element of at least one of a property of decay of an energized, or nuclear atom.

21. The system of paragraph 1 wherein the stored at least one list of cipher keys for use with communication includes at least one pseudo-randomly generated key.

22. The system of paragraph 1 wherein the cipher selection circuitry is adapted to employ a selection algorithm for selecting different message ciphers for encrypting different messages transmitted during the transmission phase of a communication session.

23. The system of paragraph 1 wherein the cipher selection circuitry is adapted to produce the selection code that prevents repeating previously selected cipher codes for the four cipher codes used in prior communication sessions with the first other secure device.

24. The system of paragraph 1 further comprising a substance at least partially surrounding at least one of the processor, memory module and cipher selection circuitry, said substance capable of preventing x-ray images to be produced of at least one of the processor, memory module and cipher selection circuitry.

25. The system of paragraph 1 further comprising:
a battery coupled to at least one of the processor and memory module;
an inert gas disposed in a cavity at least partially surrounding at least one of the processor and memory, and
a pressure sensor disposed in said cavity and coupled to the processor, wherein the processor is adapted to couple sufficient energy from the battery to at least one of the processor, memory module and cipher selection circuitry to make unreadable the at least one of the processor, memory module, and cipher selection circuitry for upon detection a signal from the pressure sensor indicative of a sufficient drop in pressure.

26. The system of paragraph 25 wherein the inert gas is selected to further provide heat dissipation.

27. The system of paragraph 1 wherein the handshake message encryption cipher key and the handshake message decryption cipher key are the same cipher key.

28. The system of paragraph 1 wherein the message encryption cipher key and the message decryption cipher key are the same cipher key.

29. In a secure device containing a processor having an input for receiving a least one message to send to a first other secure device, the processor coupled to at least one data bus, a memory module for storing at least one list of cipher keys, a cipher selection circuitry for producing a selection code based on the at least one list of cipher keys, and a network interface adapted for transmitting and receiving digital information over a network to and from the first other secure device, a method comprising the steps of:

a. the processor activating the cipher selection circuitry to generate a selection code indicative of a message encryption cipher key, a message decryption cipher key, a handshake message encryption cipher key, and a handshake message decryption cipher key, based on the at least one list of cipher keys, wherein corresponding cipher selection circuitry in the first other secure device is adapted to process the selection code to produce a copy of the message encryption cipher key, message decryption cipher key, handshake message encryption cipher key, and handshake message decryption cipher key from the stored copy of the at least one list of cipher keys in the memory of the first other secure device;

b. the processor producing a handshake message comprising unencrypted network addresses of the secure device and first other secure device, and the selection code;

c. transmitting the handshake message to the first other secure device;

d. receiving from the first other secure device, a response handshake message;

e. processing first and second segments of the response handshake message with the handshake message encryption cipher key and the handshake message decryption cipher key, respectively, to obtain first and second data sequences;

f. comparing the first data sequence to the message encryption cipher key, and the second data sequence to the message decryption, to confirm that the first and second data sequences correspond to the respective message encryption and decryption cipher keys associated with the selection code; and g. upon confirming that the obtained first and second data sequences correspond to the respective message encryption and decryption cipher keys associated with the selection code, operating in a transmission phase by encrypting at least one messages received at its input using the message encryption cipher key and transmitting the resulting encrypted at least one message via the network interface to the first other secure device.

30. The method of paragraph 29 further comprising the step of operating in a reception phase by decrypting at least one message received from the first other secure device based on the message decryption cipher key.
31. The method of paragraph 29 wherein the cipher selection circuitry activation step comprises producing the selection code based on cipher key locations of the four cipher keys within the at least one list of cipher keys.
32. The method of paragraph 29 wherein the message encryption cipher key is at least as long as a predetermined length of the message to be encrypted.
33. The method of paragraph 29 wherein the cipher selection circuitry activation step comprises producing the selection code corresponding to at least one of the four cipher keys being a transformation of at least one cipher key at a cipher key location with the at least one list of cipher keys.
34. The method of paragraph 33 wherein such transformation of at least one cipher key is a re-randomization of such at least one cipher key.
35. The method of paragraph 29 further comprising the step of retrieving from said memory module a data bus cipher code useable for at least one of encrypting or decrypting signals received and transmitted over the at least one data bus.
36. The method of paragraph 29 further comprising the step of transmitting encrypted messages to at least a second other secure device, wherein the stored at least one list of cipher keys in the memory module includes a list of cipher keys useable for encrypting messages for transmission to the second other secure device.
37. The method of paragraph 36 wherein the stored at least one list of cipher keys in the memory module include respective lists of keys useable with respect to the first and at least the second other secure device.
38. The method of paragraph 37 wherein the addresses of the first and at least the other secure devices are stored in the memory module and associated with the respective lists of cipher keys useable with respective first and at least the second other secure devices.
39. The method of paragraph 29 wherein the at least one list of cipher keys includes at least 1,000,000 cipher keys.
40. The method of paragraph 29 wherein the at least one list of cipher keys includes a number of cipher keys corresponding to at least a number of bits in at least one of the messages for transmission to the second other secure device.
41. The method of paragraph 40 wherein the at least one list of cipher keys includes a number of cipher keys so that such system would not repeat the use of any cipher key over a sufficiently long period of time.
42. The method of paragraph 29 further comprising preventing entry into the transmission phase if during the confirmation phase, the processor is unable to confirm that the obtained data sequence corresponds to the message cipher.
43. The method of paragraph 29 wherein the step of producing the unencrypted handshake message further comprises including a time stamp indicative a time of transmission of the unencrypted handshake message.
44. The method of paragraph 29 wherein the step of processor producing a handshake message further produces the handshake message comprising an encrypted predetermined identifier indicative of a property of least the first other secure device or a user of the first other secure device.
45. The method of paragraph 44 further comprising the steps of (a) decrypting a third segment of the response handshake message to obtain a third data sequence, (b) comparing such third data sequence to the predetermined identifier, and (c) enter the transmission phase if the data sequence corresponds to the predetermined identifier.
46. The method of paragraph 29 wherein the stored at least one list of cipher keys for use with communication includes at least one randomly-generated key.
47. The system of paragraph 46 wherein the stored at least one randomly-generated key was generated based on monitoring at least one random property of a counting of an element of a physical property over time.
48. The method of paragraph 47 wherein the stored at least one randomly-generated key was generated based on monitoring at least one random property of a counting of the element of at least one of a property of decay of an energized, or nuclear atom.
49. The method of paragraph 29 wherein the step of producing an unencrypted handshake message further comprises executing a selection algorithm for selecting different message ciphers for encrypting different messages transmitted during the transmission phase of a communication session.
50. The method of paragraph 29 wherein the step of producing an unencrypted handshake message further comprises executing a selection algorithm for selecting the message cipher from the at least one list of cipher codes in the memory module that prevents repeating previously selected cipher codes for prior communication sessions with the first other secure device.
51. The method of paragraph 29 wherein the handshake message encryption cipher key and the handshake message decryption cipher key are the same cipher key.
52. The method of paragraph 29 wherein the message encryption cipher key and the message decryption cipher key are the same cipher key.
53. A secure device for transmitting encrypted communications over a network to a plurality of other secure devices comprising:
a. a processor having an input for receiving a least one message to send to a first other secure device, the processor coupled to at least one data bus;
b. a memory module communicatively coupled to the processor, and for storing at least one list of cipher keys for use with communication with the first other secure device, the first other secure device having a memory with a stored copy of the at least one list of cipher keys;
c. cipher selection circuitry coupled to the processor, wherein the cipher selection circuitry is adapted to generate a least a selection code indicative of a message encryption cipher key, and a handshake message encryption cipher key, that are based on the at least one list of cipher keys, the corresponding cipher selection circuitry in each of the plurality of other secure devices being adapted to process the selection code to produce a copy of the message encryption cipher key and handshake message encryption cipher key, from the stored copy of the at least one list of cipher keys in each of the plurality of other secure devices; and d. a network interface communicatively coupled to said processor and adapted for transmitting and receiving digital information over a network to the plurality of other secure devices, wherein the processor is adapted to operate in an initialization phase by activating the cipher selection circuitry to produce the selection code, and to produce and transmit a handshake message via the network interface to the plurality of other secure devices, the handshake message comprising an unencrypted group number associated with the plurality of other secure devices, and the selection code, and wherein the processor is further adapted to operate in a transmission phase by encrypting at least one message received at its input based on the message encryption cipher key, and to transmit the resulting encrypted at least one message via the network interface to the plurality of other secure devices.

54. In a secure device containing a processor having an input for receiving a least one message to send to a plurality of other secure devices, the processor coupled to at least one data bus, a memory module for storing at least one list of cipher keys, a cipher selection circuitry for producing a selection code based on the at least one list of cipher keys, and a network interface adapted for transmitting to the plurality of other secure devices, a method comprising the steps of:

a. the processor activating the cipher selection circuitry to generate a selection code indicative of a message encryption cipher key and a handshake message encryption cipher key, based on the at least one list of cipher keys, wherein corresponding cipher selection circuitry in each of the plurality of other secure devices is adapted to process the selection code to produce a copy of the message encryption cipher key and handshake message encryption cipher key from the stored copy of the at least one list of cipher keys in the memory of each of the plurality of other secure devices;

b. the processor producing a handshake message comprising unencrypted group number associated with the plurality of other secure devices, and the selection code;

c. transmitting the handshake message to the plurality of other secure devices;

d. operating in a transmission phase by encrypting at least one messages received at its input using the message encryption cipher key and transmitting the resulting encrypted at least one message via the network interface to the plurality of other secure devices.

What is claimed is:

1. A secure device for transmitting encrypted communications over a network comprising:

a. a processor having an input for receiving at least one message to send to a first other secure device, the processor coupled to at least one data bus;

b. a memory communicatively coupled to the processor, and for storing at least one list of cipher keys for use with communication with the first other secure device, the first other secure device also having a memory with an identical stored copy of the at least one list of cipher keys;

c. cipher selection circuitry coupled to the processor, wherein the cipher selection circuitry is adapted to generate a selection code indicative of a message encryption cipher key, a message decryption cipher key, a handshake message encryption cipher key, and a handshake message decryption cipher key, that are based on the at least one list of cipher keys identically stored in each of the memories of the secure device and the first other secure device, wherein the first other secure device has corresponding cipher selection circuitry adapted to process the selection code to produce a copy of the message encryption cipher key, message decryption cipher key, handshake message encryption cipher key, and handshake message decryption cipher key, from the stored copy of the at least one list of cipher keys in the memory of the first other secure device; and d, a network interface communicatively coupled to said processor and adapted for transmitting and receiving digital information over a network to and from the first other secure device, wherein the processor is adapted to operate in an initialization phase by activating the cipher selection circuitry to produce the selection code, and to produce and transmit a handshake message via the network interface to the first other secure device, the handshake message comprising unencrypted network addresses of the secure device and the first other secure device, and the selection code, and wherein the processor is further adapted to operate in a confirmation phase upon receiving a response handshake message transmitted by the first other secure device and to process first and second segments of the response handshake message with the handshake message encryption cipher key and the handshake message decryption cipher key, respectively, to obtain first and second data sequences and to compare the first data sequence to the message encryption cipher key, and to compare the second data sequence to the message decryption, to confirm that the first and second data sequences correspond to the respective message encryption and decryption cipher keys associated with the selection code, and wherein, upon confirming that the obtained first and second data sequences correspond to the respective message encryption and decryption cipher keys associated with the selection code, the processor is further adapted to operate in a transmission phase by encrypting at least one message received at its input based on the message encryption cipher key, and to transmit the resulting encrypted at least one message via the network interface to the first other secure device.

2. The system of claim 1 wherein the processor is further adapted to operate in a reception phase by decrypting at least one message received from the first other secure device based on the message decryption cipher key.

3. The system of claim 1, wherein the processor is adapted to retrieve from said memory a data bus cipher code for at least one of encrypting or decrypting signals received and transmitted over the at least one data bus.

4. The system of claim 1, wherein the system is adapted to transmit encrypted messages to at least a second other secure device, and wherein the stored at least one list of cipher keys in the memory includes a list of cipher keys usable for encrypting the messages to the second other secure device.

5. The system of claim 1 wherein the processor is adapted to not enter the transmission phase if during the confirmation phase the processor is unable to confirm that the obtained first and second data sequence corresponds to the respective message encryption and decryption cipher keys associated with the selection code.

6. The system of claim 1 wherein the stored at least one list of cipher keys for use with communication includes at least one randomly-generated key.

7. The system of claim 1 wherein the stored at least one list of cipher keys for use with communication includes at least one pseudo-randomly generated key.

8. The system of claim 1 wherein the cipher selection circuitry is adapted to produce the selection code that prevents repeating previously selected cipher codes for the four cipher codes used in prior communication sessions with the first other secure device.

9. The system of claim 1 wherein the handshake message encryption cipher key and the handshake message decryption cipher key are the same cipher key.

10. The system of claim 1 wherein the message encryption cipher key and the message decryption cipher key are the same cipher key.

11. In a secure device containing a processor having an input for receiving a least one message to send to a first other secure device, the processor coupled to at least one data bus, a memory for storing at least one list of cipher keys, a cipher selection circuitry for producing a selection code based on the at least one list of cipher keys, and a network interface adapted for transmitting and receiving digital information over a network to and from the first other secure device, wherein the first other secure device also has a memory storing an identical copy of the at least one list of cipher keys, a method comprising the steps of:
 a. the processor activating the cipher selection circuitry to generate a selection code indicative of a message encryption cipher key, a message decryption cipher key, a handshake message encryption cipher key, and a handshake message decryption cipher key, based on the at least one list of cipher keys identically stored in each of the memories of the secure device and the first other secure device, wherein corresponding cipher selection circuitry in the first other secure device is adapted to process the selection code to produce a copy of the message encryption cipher key, message decryption cipher key, handshake message encryption cipher key, and handshake message decryption cipher key from the stored copy of the at least one list of cipher keys in the memory of the first other secure device; b. the processor producing a handshake message comprising unencrypted network addresses of the secure device and first other secure device, and the selection code;
 c. transmitting the handshake message to the first other secure device;
 d. receiving from the first other secure device, a response handshake message;
 e. processing first and second segments of the response handshake message with the handshake message encryption cipher key and the handshake message decryption cipher key, respectively, to obtain first and second data sequences;
 f. comparing the first data sequence to the message encryption cipher key, and the second data sequence to the message decryption, to confirm that the first and second data sequences correspond to the respective message encryption and decryption cipher keys associated with the selection code; and
 g. upon confirming that the obtained first and second data sequences correspond to the respective message encryption and decryption cipher keys associated with the selection code, operating in a transmission phase by encrypting at least one messages received at its input using the message encryption cipher key and transmitting the resulting encrypted at least one message via the network interface to the first other secure device.

12. The method of claim 11 further comprising the step of operating in a reception phase by decrypting at least one message received from the first other secure device based on the message decryption cipher key.

13. The method of claim 11, further comprising the step of transmitting encrypted messages to at least a second other secure device, wherein the stored at least one list of cipher keys in the memory includes a list of cipher keys usable for encrypting messages for transmission to the second other secure device.

14. The method of claim 11 further comprising preventing entry into the transmission phase if during the confirmation phase, the processor is unable to confirm that the obtained data sequence corresponds to the message cipher.

15. The method of claim 11 wherein the stored at least one list of cipher keys for use with communication includes at least one randomly-generated key.

16. The method of claim 11 wherein the step of producing an unencrypted handshake message further comprises executing a selection algorithm for selecting different message ciphers for encrypting different messages transmitted during the transmission phase of a communication session.

17. The method of claim 11, wherein the step of producing an unencrypted handshake message further comprises executing a selection algorithm for selecting the message cipher from the at least one list of cipher codes in the memory that prevents repeating previously selected cipher codes for prior communication sessions with the first other secure device.

18. The method of claim 11 wherein the handshake message encryption cipher key and the handshake message decryption cipher key are the same cipher key.

19. The method of claim 11 wherein the message encryption cipher key and the message decryption cipher key are the same cipher key.

20. A secure device for transmitting encrypted communications over a network to a plurality of other secure devices comprising:
 a. a processor having an input for receiving a least one message to send to a first other secure device, the processor coupled to at least one data bus;
 b. a memory communicatively coupled to the processor, and for storing at least one list of cipher keys for use with communication with the plurality of other secure devices, the plurality of other secure devices also each having a memory with an identical stored copy of the at least one list of cipher keys;
 c. cipher selection circuitry coupled to the processor, wherein the cipher selection circuitry is adapted to generate a least a selection code indicative of a message encryption cipher key, and a handshake message encryption cipher key, that are based on the at least one list of cipher keys identically stored in each of the memories of the secure device and the plurality of other secure devices, wherein each of the other secure devices has corresponding cipher selection circuitry adapted to process the selection code to produce a copy of the message enclyption cipher key and handshake message encryption cipher key, from the stored copy of the at least one list of cipher keys in each of the plurality of other secure devices; and
 d. a network interface communicatively coupled to said processor and adapted for transmitting and receiving digital information over a network to the plurality of other secure devices, wherein the processor is adapted to operate in an initialization phase by activating the cipher selection circuitry to produce the selection code, and to produce and transmit a handshake message via the network interface to the plurality of other secure devices, the handshake message comprising an unencrypted group number associated with the plurality of other secure devices, and the selection code, and wherein the processor is further adapted to operate in a transmission phase by encrypting at least one message received at its input based on the message encryption cipher key, and to transmit the resulting encrypted at least one message via the network interface to the plurality of other secure devices.

21. In a secure device containing a processor having an input for receiving a least one message to send to a plurality of other secure devices, the processor coupled to at least one data bus, a memory for storing at least one list of cipher keys, a cipher selection circuitry for producing a selection code based on the at least one list of cipher keys, and a network interface adapted for transmitting to the plurality of other secure devices, wherein each of the plurality of other secure devices also has a memory storing an identical copy of the at least one list of cipher keys, a method comprising the step of:

a. the processor activating the cipher selection circuitry to generate a selection code indicative of a message encryption cipher key and a handshake message encryption cipher key, based on the at least one list of cipher keys identically stored in each of the memories of the secure device and the plurality of other secure devices, wherein corresponding cipher selection circuitry in each of the plurality of other secure devices is adapted to process the selection code to produce a copy of the message encryption cipher key and handshake message encryption cipher key from the stored copy of the at least one list of cipher keys in the memory of each of the plurality of other secure devices;

b. the processor producing a handshake message comprising unencrypted group number associated with the plurality of other secure devices, and the selection code;

c. transmitting the handshake message to the plurality of other secure devices;

d. operating in a transmission phase by encrypting at least one messages received at its input using the message encryption cipher key and transmitting the resulting encrypted at least one message via the network interface to the plurality of other secure devices.

* * * * *